(12) United States Patent
Kuratsu et al.

(10) Patent No.: US 11,108,079 B2
(45) Date of Patent: Aug. 31, 2021

(54) LITHIUM-ION SECONDARY BATTERY AND ASSEMBLED BATTERY

(71) Applicant: KANEKA CORPORATION, Osaka (JP)

(72) Inventors: Masato Kuratsu, Settsu (JP); Yukimasa Niwa, Settsu (JP)

(73) Assignee: KANEKA CORPORATION, Osaka (JP)

( * ) Notice: Subject to any disclaimer, the term of this patent is extended or adjusted under 35 U.S.C. 154(b) by 37 days.

(21) Appl. No.: 16/306,703

(22) PCT Filed: Jun. 6, 2017

(86) PCT No.: PCT/JP2017/021017
§ 371 (c)(1),
(2) Date: Dec. 3, 2018

(87) PCT Pub. No.: WO2017/213149
PCT Pub. Date: Dec. 14, 2017

(65) Prior Publication Data
US 2019/0115621 A1    Apr. 18, 2019

(30) Foreign Application Priority Data
Jun. 8, 2016 (JP) .............................. JP2016-114756

(51) Int. Cl.
*H01M 4/505* (2010.01)
*H01M 10/0525* (2010.01)
(Continued)

(52) U.S. Cl.
CPC ......... *H01M 10/0525* (2013.01); *H01M 4/13* (2013.01); *H01M 4/131* (2013.01);
(Continued)

(58) Field of Classification Search
CPC ...... H01M 4/625; H01M 4/505; H01M 4/525; H01M 4/485; H01M 4/386; H01M 4/62;
(Continued)

(56) References Cited

U.S. PATENT DOCUMENTS 6,274,271 B1    8/2001  Koshiba et al.
2001/0012591 A1  8/2001  Michot et al.
(Continued)

FOREIGN PATENT DOCUMENTS

CN     104934589 A    9/2015
EP     3 096 388 A1   11/2016
(Continued)

OTHER PUBLICATIONS

International Search Report dated Sep. 5, 2017, in PCT/JP2017/021017, filed Jun. 6, 2017.
(Continued)

*Primary Examiner* — Uyen M Tran
(74) *Attorney, Agent, or Firm* — Oblon, McClelland, Maier & Neustadt, L.L.P.

(57) ABSTRACT

A lithium-ion secondary battery includes: a laminate including a positive electrode, a negative electrode, and a separator; a nonaqueous electrolyte solution; terminals; and an inclusion body. The negative electrode includes a negative electrode active material including a titanium-containing oxide, and at least one negative electrode additive selected from a carbon material, a silicon-based material, a tin-based material, and a bismuth-based material. A relation between a weight (Ma) of the negative electrode additive and a weight (Mt) of the negative electrode active material is $1.0 < Mt/Ma < 30.0$. An area (Sp) of a positive electrode active material layer of the positive electrode is smaller than an area (Sn) of a negative electrode active material layer of the negative electrode. A positive electrode capacity (Qp) is smaller than a negative electrode capacity (Qn).

11 Claims, 1 Drawing Sheet

(51) Int. Cl.
*H01M 4/485* (2010.01)
*H01M 4/525* (2010.01)
*H01M 4/62* (2006.01)
*H01M 4/131* (2010.01)
*H01M 4/13* (2010.01)
*H01M 10/0566* (2010.01)

(52) U.S. Cl.
CPC ........... *H01M 4/485* (2013.01); *H01M 4/505* (2013.01); *H01M 4/525* (2013.01); *H01M 4/62* (2013.01); *H01M 4/625* (2013.01); *H01M 10/0566* (2013.01); *Y02E 60/10* (2013.01); *Y02T 10/70* (2013.01)

(58) Field of Classification Search
CPC .......... H01M 4/13; H01M 4/38; H01M 4/131; H01M 4/387; H01M 4/136; H01M 2004/021; H01M 10/0566; H01M 10/0525
See application file for complete search history.

(56) References Cited

U.S. PATENT DOCUMENTS

| | | | |
|---|---|---|---|
| 2002/0182492 | A1 | 12/2002 | Kimura et al. |
| 2012/0270101 | A1 | 10/2012 | Higashizaki et al. |
| 2013/0084489 | A9 | 4/2013 | Higashizaki et al. |
| 2013/0122362 | A1* | 5/2013 | Sato ...................... H01M 4/364 429/210 |
| 2014/0120386 | A1* | 5/2014 | Jagannathan ......... H01M 4/625 429/53 |
| 2015/0207113 | A1 | 7/2015 | Miura et al. |
| 2015/0270544 | A1 | 9/2015 | Yoshida et al. |
| 2016/0087312 | A1 | 3/2016 | Lee et al. |
| 2016/0351891 | A1* | 12/2016 | Sawada ............... H01M 10/052 |

FOREIGN PATENT DOCUMENTS

| | | |
|---|---|---|
| JP | 10-69922 A | 3/1998 |
| JP | 11-171853 A | 6/1999 |
| JP | 2000-348725 A | 12/2000 |
| JP | 2003-115328 A | 4/2003 |
| JP | 2014-75285 A | 4/2014 |
| JP | 2015-122340 A | 7/2015 |
| JP | 2015-159103 A | 9/2015 |
| JP | 2015-187929 A | 10/2015 |
| WO | WO 2015/107832 A1 | 7/2015 |

OTHER PUBLICATIONS

Decision of Refusal dated Oct. 23, 2019 in Japanese Patent Application No. 2018-521740, 3 pages.

Extended European Search Report dated Dec. 17, 2019, in Patent Application No. 17810324.8, 8 pages.

* cited by examiner

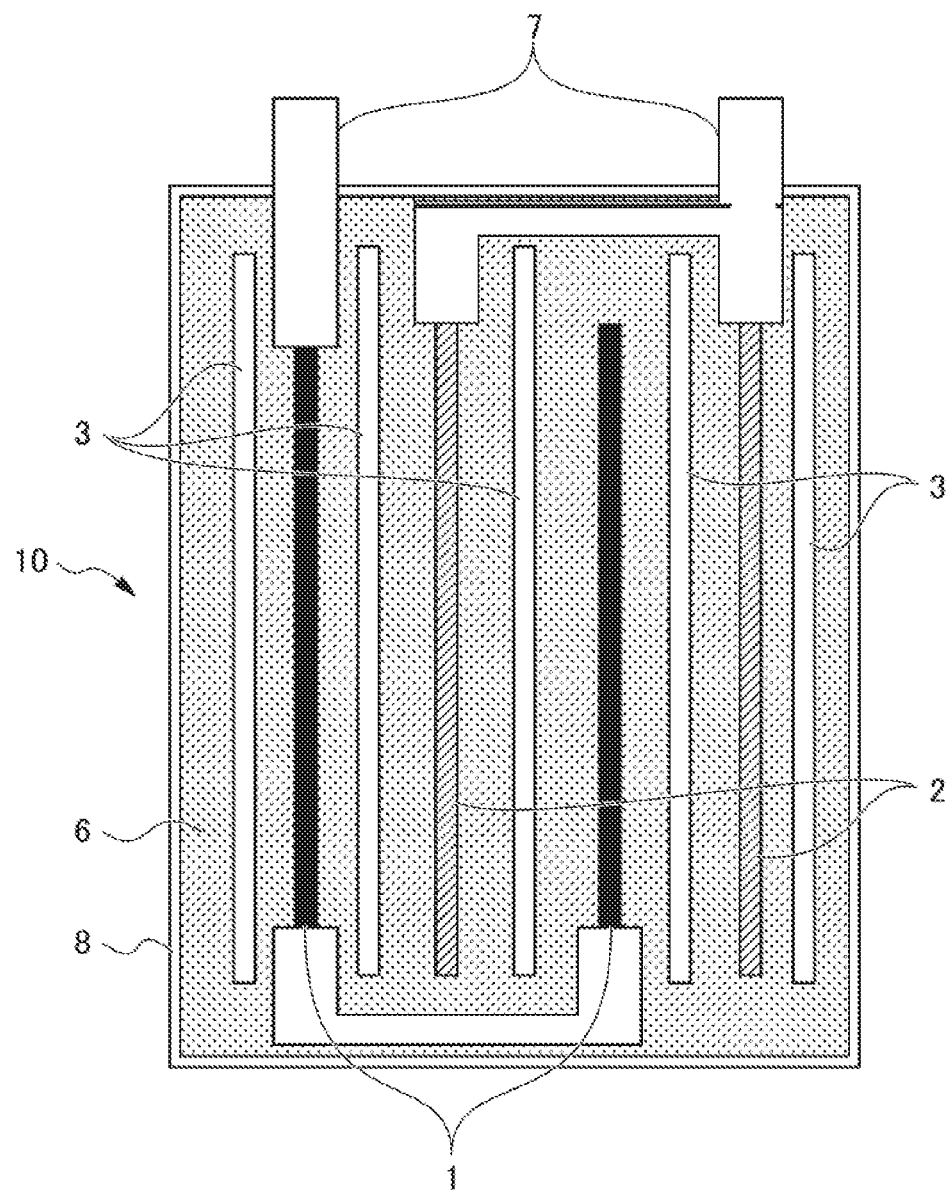

LITHIUM-ION SECONDARY BATTERY AND ASSEMBLED BATTERY

TECHNICAL FIELD

The present invention relates to a lithium-ion secondary battery and an assembled battery.

TECHNICAL BACKGROUND

A lithium ion secondary battery used in a mobile device, a hybrid vehicle, an electric vehicle, a household electricity storage system or the like is required to have not only a high energy density but also multiple characteristics such as safety and cycle stability in a well-balanced manner. Various studies on electrode compositions in such a lithium-ion secondary battery have been conducted.

Patent Document 1 discloses a lithium-ion secondary battery in which cycle characteristics are improved by using a carbon material and lithium titanate for a negative electrode and designing the battery as a negative electrode regulation battery.

RELATED ART

Patent Document

[Patent Document 1] Japanese Patent Laid-Open Publication No. 2000-348725.

SUMMARY OF THE INVENTION

Problems to be Solved by the Invention

However, the inventors have found that, in the technology of Patent Document 1, since the battery is a negative electrode regulation battery, when overcharging occurs in the battery, a potential of the negative electrode may greatly change at an early stage to become a low potential, and precipitation of a lithium metal onto the negative electrode may occur, and the safety of the battery may be impaired.

The present invention is accomplished in order to solve the above problem. An object of the present invention is to provide a lithium-ion secondary battery and an assembled battery that have good cycle characteristics and safety.

Means for Solving the Problems

A lithium-ion secondary battery includes: a laminate including a positive electrode, a negative electrode, and a separator; a nonaqueous electrolyte solution; terminals; and an inclusion body. The negative electrode includes: a negative electrode active material including a titanium-containing oxide; and at least one negative electrode additive selected from a carbon material, a silicon-based material, a tin-based material, and a bismuth-based material. A relation between a weight (Ma) of the negative electrode additive and a weight (Mt) of the negative electrode active material is $1.0 < Mt/Ma < 30.0$. An area (Sp) of a positive electrode active material layer of the positive electrode is smaller than an area (Sn) of a negative electrode active material layer of the negative electrode. A positive electrode capacity (Qp) is smaller than a negative electrode capacity (Qn).

Effect of the Invention

According to the present invention, a lithium-ion secondary battery and an assembled battery that have good cycle characteristics and safety can be obtained.

BRIEF DESCRIPTION OF THE DRAWINGS

FIG. 1 is a cross-sectional view of a lithium-ion secondary battery.

MODE FOR CARRYING OUT THE INVENTION

For ease of understanding, a lithium-ion secondary battery according to the present invention is described with reference to FIG. 1 which is an embodiment.

<Lithium-Ion Secondary Battery>

A lithium-ion secondary battery 10 of FIG. 1 includes: a laminate including a positive electrode 1, a negative electrode 2 and a separator 3; a nonaqueous electrolyte solution 6; terminals 7; and an inclusion body 8.

<Positive Electrode and Negative Electrode>

The electrodes (the positive electrode and the negative electrode) have a function of performing insertion and extraction of metal ions, that is, performing an electrode reaction. Due to the electrode reaction, charging and discharging of the lithium-ion secondary battery are performed.

In the positive electrode, a positive electrode active material layer including a positive electrode active material is formed on both sides of a current collector. In the negative electrode, a negative electrode active material layer is formed on both sides of a current collector, the negative electrode active material layer including: as a negative electrode active material a titanium-containing oxide; and as a negative electrode additive at least one selected from a group consisting of a carbon material, a silicon-based material, a tin-based material, and a bismuth-based material.

A current collector is a member that collects current from an active material layer.

As the current collector of the positive electrode, there is no particular limitation as long as the current collector of the positive electrode is formed of a conductive material, and aluminum and an aluminum alloy, or a material obtained by coating a surface of a metal other than aluminum (such as copper, SUS, nickel, titanium, and alloys thereof) with aluminum are suitably used.

As the aluminum used for the current collector of the positive electrode, from a point of view of being stable in a positive electrode reaction atmosphere, high purity aluminum represented by JIS standards 1030, 1050, 1085, 1N90, 1N99 and the like is preferable.

A thickness of the current collector of the positive electrode is not particularly limited, but is preferably 10 μm or more and 100 μm or less.

As the current collector of the negative electrode, there is no particular limitation as long as the current collector of the negative electrode is formed of a conductive material, and aluminum and an aluminum alloy, or a material obtained by coating a surface of a metal other than aluminum (such as copper, SUS, nickel, titanium, and alloys thereof) with aluminum are suitably used.

A thickness of the current collector of the negative electrode is not particularly limited, but is preferably 10 μm or more and 100 μm or less.

An active material is a substance that contributes to an electrode reaction.

As the positive electrode active material, a metal oxide or a lithium transition metal composite oxide or the like is suitably used.

As the lithium transition metal composite oxide, from a point of view of having a high energy density, a layered rock salt type lithium transition metal composite oxide represented by $Li_aNi_bCo_cMn_dX_eO_2$ (where X is at least one selected from a group consisting of B, Mg, Al, Si, Ti, V, Cr, Fe, Cu, Zn, Ga, Ge, Sr, Zr, Nb, Mo, In and Sn; $0<a\leq1.2$; $0\leq b, c, d, e\leq1$; and $b+c+d+e=1$), or $Li_aNi_bCo_cMn_dX_eO_2$ with a being greater than 1, which is a so-called lithium-rich-based layered rock salt type lithium transition metal composite oxide, is preferable.

As the layered rock salt type lithium transition metal composite oxide, from a point of view of an energy density and cycle characteristics, $Li_aCo_{1-x-y}Ni_xMn_yO_2$ (where $0.9\leq a\leq1.2$; $x\geq0$; $y\geq0$; $0\leq x+y\leq1$), or $Li_aNi_{1-b-c}Co_bAl_cO_2$ (where $0.9\leq a\leq1.2$; $b\geq0$; $c\geq0$; $0\leq b+c\leq0.3$) is preferable, one selected from a group consisting of $LiNi_{1/3}Co_{1/3}Mn_{1/3}O_2$, $LiNi_{0.5}Co_{0.2}Mn_{0.3}O_2$, $LiNi_{0.5}Mn_{0.5}O_2$, $LiNi_{0.4}Co_{0.2}Mn_{0.4}O_2$, $LiNi_{0.1}Co_{0.8}Mn_{0.1}O_2$, $LiNi_{0.8}Co_{0.16}Al_{0.4}O_2$, $LiNi_{0.8}Co_{0.15}Al_{0.05}O_2$, $LiNiO_2$, $LiMnO_2$, and $LiCoO_2$ is more preferable, and, from a point of view of output characteristics and a gas generation suppression effect, $LiNi_{1/3}Co_{1/3}Mn_{1/3}O_2$, $LiNi_{0.5}Co_{0.2}Mn_{0.3}O_2$, $LiNi_{0.4}Co_{0.2}Mn_{0.4}O_2$, $LiNi_{0.1}Co_{0.8}Mn_{0.1}O_2$, $LiNi_{0.8}Co_{0.16}Al_{0.04}O_2$, $LiNi_{0.8}Co_{0.15}Al_{0.05}O_2$, and $LiCoO_2$ are even more preferable, and $LiNi_{1/3}Co_{1/3}Mn_{1/3}O_2$, $LiNi_{0.5}Co_{0.2}Mn_{0.3}O_2$, and $LiNi_{0.4}Co_{0.2}Mn_{0.4}O_2$ are particularly preferable.

Further, the positive electrode may include a spinel type lithium manganate represented by $Li_{1+x}M_yMn_{2-x-y}O_4$ (where $0\leq x\leq0.2$; $0<y\leq0.6$; and M is an element belonging to Groups 2-13 and Periods 3-4 (however, Mn is excluded)) as a positive electrode active material. When the positive electrode includes a spinel type lithium manganate, safety and cycle stability of the positive electrode are improved.

As the spinel type lithium manganate, one selected from a group consisting of $Li_{1+x}Al_yMn_{2-x-y}O_4$ ($0\leq x\leq0.1$, $0<y\leq0.1$), $Li_{1+x}Mg_yMn_{2-x-y}O_4$ ($0\leq x\leq0.1$, $0<y\leq0.1$), $Li_{1+x}Zn_yMn_{2-x-y}O_4$ ($0\leq x\leq0.1$, $0<y\leq0.1$), $Li_{1+x}Cr_yMn_{2-x-y}O_4$ ($0\leq x\leq0.1$, $0<y\leq0.1$), $Li_{1+x}Ni_yMn_{2-x-y}O_4$ ($0\leq x\leq0.05$, $0.45\leq y\leq0.5$), $Li_{1+x}Ni_{y-z}Al_zMn_{2-x-y}O_4$ ($0\leq x\leq0.05$, $0.45\leq y\leq0.5$, $0.005\leq z\leq0.03$) and $Li_{1+x}Ni_{y-z}Ti_zMn_{2-x-y}O_4$ ($0\leq x\leq0.05$, $0.45\leq y\leq0.5$, $0.005\leq z\leq0.03$) is preferable, and, from a point of view that the effects of reduction in gas generation and improvement in safety can be more sufficiently obtained, $Li_{1+x}Al_yMn_{2-x-y}O_4$ ($0\leq x\leq0.1$, $0<y\leq0.1$), $Li_{1+x}Mg_yMn_{2-x-y}O_4$ ($0\leq x\leq0.1$, $0<y\leq0.1$), $Li_{1+x}Ni_yMn_{2-x-y}O_4$ ($0\leq x\leq0.05$, $0.45\leq y\leq0.5$) and $Li_{1+x}Ni_{y-z}Ti_zMn_{2-x-y}O_4$ ($0\leq x\leq0.05$, $0.45\leq y\leq0.5$, $0.005\leq z\leq0.03$) are more preferable.

These positive electrode active materials may each be independently used or two or more of these positive electrode active materials may be used in combination.

Further, a surface of the positive electrode active material may be covered with a carbon material, a metal oxide or a polymer in order to improve conductivity and stability.

The negative electrode active material is required to contain a titanium-containing oxide. As the titanium-containing oxide, a lithium titanate and/or a titanium dioxide is preferable, and, from a point of view of high stability of the material itself, a lithium titanate is more preferable, and, from a point of view that expansion and contraction of an active material in a lithium ion insertion and detachment reaction is small, a lithium titanate having a spinel structure is even more preferable.

The lithium titanate may contain trace amounts of elements other than lithium and titanium such as Nb.

Examples of the titanium dioxide include a B type titanium dioxide, an anatase type titanium dioxide, a ramsdellight type titanium dioxide, and the like. However, from a point of view of having a small irreversible capacity and excellent cycle stability, the B type titanium dioxide is preferable.

Surfaces of these negative electrode active materials may be covered with a carbon material, a metal oxide, a polymer or the like in order to improve conductivity or stability.

An average particle diameter of the negative electrode active material is preferably 1 μm or more and 20 μm or less from a point of view of suppressing a side reaction, and more preferably 2 μm or more and 15 μm or less from a point of view of cycle characteristics, and even more preferably 3 μm or more and 10 μm or less.

When a specific surface area of the negative electrode active material is 1 $m^2$/g or more and 25 $m^2$/g or less, the negative electrode active material can be suitably used. The specific surface area of the negative electrode active material is more preferably 1.5 $m^2$/g or more and 20 $m^2$/g or less from a point of view of exhibiting better cycle characteristics, and is even more preferably 2 $m^2$/g or more and 15 $m^2$/g or less from a point of view of achieving good suppression of a side reaction.

While contributing to the electrode reaction, the negative electrode additive also has a function of suppressing precipitation of Li metal on the negative electrode by accepting excess Li ions released from the positive electrode active material when the battery is overcharged.

The negative electrode additive is required to be at least one selected from a carbon material, a silicon-based material, a tin-based material, and a bismuth-based material. Examples of the carbon material include natural graphite, artificial graphite, hard carbon, soft carbon and the like. Examples of the silicon-based material include silica alone, SiO, $SiO_2$, an alloy of Si and a transition metal, and the like. Examples of the tin-based material include tin alone, SnO, $SnO_2$, an alloy of Sn and a transition metal, and the like. Examples of the bismuth-based material include bismuth alone, $Bi_2O_3$, and the like.

As the negative electrode additive, a carbon material, Si alone, SiO, Sn alone, and Bi alone are preferable from a point of view of improving the safety of the battery, and graphite, hard carbon, or soft carbon is particularly preferable from a point of view of achieving a good balance between the safety and the cycle characteristics.

When a specific surface area of the negative electrode additive is 1 $m^2$/g or more and 25 $m^2$/g or less, the negative electrode additive can be suitably used. The specific surface area of the negative electrode additive is more preferably 1.5 $m^2$/g or more and 20 $m^2$/g or less from a point of view of exhibiting better cycle characteristics, and is even more preferably 2 $m^2$/g or more and 15 $m^2$/g or less from a point of view of achieving good suppression of a side reaction.

A relation between a weight (Ma) of the negative electrode additive included in the negative electrode active material layer and a weight (Mt) of the negative electrode active material is required to be $1.0<Mt/Ma<30.0$, and, from a point of view of achieving a good balance between the stability of the cycle characteristics, the safety, and the energy density, is preferably $1.0<Mt/Ma\leq10.0$, more preferably $1.0<Mt/Ma<10.0$, and even more preferably $1.5<Mt/Ma<10.0$.

An area (Sp) of the positive electrode active material layer of the positive electrode is required to be smaller than an area (Sn) of the negative electrode active material layer of the negative electrode, and, from a point of view of achieving a good balance between the stability of the cycle characteristics, the safety, and the energy density, 0.9<(Sp/Sn)<1.0 is preferable.

An area of an active material layer refers to a surface area of an active material layer portion of an electrode. When the active material layer has a thickness, an area corresponding to the thickness is also included in the surface area.

Thicknesses of the positive electrode and the negative electrode are not particularly limited, but are preferably each 10 μm or more and 200 μm or less.

A density of the positive electrode active material layer is preferably 1.0 g/cm$^3$ or more and 4.0 g/cm$^3$ or less, and is more preferably 1.5 g/cm$^3$ or more and 3.5 g/cm$^3$ or less from a point of view of achieving sufficient contact between the positive electrode active material and a conductive additive and allowing the nonaqueous electrolyte solution (to be described later) to easily penetrate into the positive electrode, and is even more preferably 2.0 g/cm$^3$ or more and 3.0 g/cm$^3$ or less from a point of view of achieving an optimized balance between the contact between the positive electrode active material and the conductive additive and the ease of the penetration of the nonaqueous electrolyte solution into the positive electrode.

A density of the negative electrode active material layer is preferably 0.8 g/cm$^3$ or more and 3.0 g/cm$^3$ or less, and is more preferably 0.9 g/cm$^3$ or more and 2.7 g/cm$^3$ or less from a point of view of achieving sufficient contact between the negative electrode active material and a conductive additive and allowing the nonaqueous electrolyte solution (to be described later) to easily penetrate into the negative electrode, and is particularly preferably 1.0 g/cm$^3$ or more and 2.5 g/cm$^3$ or less from a point of view of achieving an optimized balance between the contact between the negative electrode active material and the conductive additive and the ease of the penetration of the nonaqueous electrolyte solution into the negative electrode.

The densities of the positive electrode active material layer and the negative electrode active material layer may also be controlled by compressing the electrodes until the electrodes have desired thicknesses. A method for performing the compression is not particularly limited. However, for example, the compression can be performed using a roll press, a hydraulic press or the like.

The densities of the positive electrode active material layer and the negative electrode active material layer are calculated from the thickness and the weight of the positive electrode active material layer and the negative electrode active material layer.

A positive electrode capacity (Qp) is required to be smaller than a negative electrode capacity (Qn), and 0.9<Qp/Qn<1.0 is preferable.

An example of a method for measuring Qp is a method in which a half battery in which a counter electrode Li metal and the positive electrode oppose each other is subjected to charging and discharging and a potential of the counter electrode Li metal is taken as a capacity per 1 cm$^2$ of the positive electrode when a termination voltage during discharging is 3.0 V and a termination voltage during charging is 4.3 V. The above voltage values are all values based on lithium.

An example of a method for measuring Qn is a method in which a half battery in which a counter electrode Li metal and the negative electrode oppose each other is subjected to charging and discharging and a potential of the counter electrode Li metal is taken as a capacity per 1 cm$^2$ of the negative electrode when a termination voltage during discharging is 1.2 V and a termination voltage during charging is 3.0 V. The above voltage values are all values based on lithium.

The positive electrode and the negative electrode may each further contain a conductive additive. A conductive additive is a conductive substance having a function of assisting conductivity of an electrode.

The conductive additive of the positive electrode is not particularly limited as long as the conductive additive is a conductor. However, a carbon material is preferable. Examples of the carbon material include natural graphite, artificial graphite, vapor-grown carbon fiber, carbon nanotubes, acetylene black, ketchen black, furnace black, and the like. These carbon materials may each be independently used, or two or more of these carbon materials may be used in combination.

An amount of the conductive additive of the positive electrode with respect to 100 parts by weight of the positive electrode active material is preferably 1 part by weight or more and 30 parts by weight or less, and more preferably 2 parts by weight or more and 15 parts by weight or less. When the amount of the conductive additive of the positive electrode is within this range, the conductivity of the positive electrode is sufficiently ensured.

As the conductive additive of the negative electrode, a metallic material such as copper or nickel, or a carbon material such as natural graphite, artificial graphite, vapor-grown carbon fiber, carbon nanotubes, acetylene black, ketchen black, or furnace black, is suitably used. These conductive additives may each be independently used, or two or more of these conductive additives may be used in combination.

An amount of the conductive additive of the negative electrode with respect to 100 parts by weight of the negative electrode active material is preferably 1 part by weight or more and 30 parts by weight or less, and more preferably 2 parts by weight or more and 15 parts by weight or less. When the amount of the conductive additive of the negative electrode is within this range, the conductivity of the negative electrode is sufficiently ensured.

The positive electrode and the negative electrode may each further contain a binder. A binder is a material that enhances a binding property between materials in an active material layer and enhances a binding property between an active material layer and a current collector.

As a binder, at least one selected from a group consisting of polyvinylidene fluoride (PVdF), polytetrafluoroethylene (PTFE), styrene-butadiene rubber, polyimide, and derivatives thereof, can be used.

An amount of the binder of the positive electrode with respect to 100 parts by weight of the positive electrode active material is preferably 1 part by weight or more and 30 parts by weight or less, and more preferably 2 parts by weight or more and 15 parts by weight or less. When the amount of the binder of the positive electrode is within this range, adhesiveness between the positive electrode active material and the conductive additive can be maintained and sufficient adhesiveness to the current collector can be obtained.

An amount of the binder of the negative electrode with respect to 100 parts by weight of the negative electrode active material is preferably 1 part by weight or more and 30 parts by weight or less, and more preferably 2 parts by weight or more and 15 parts by weight or less. When the amount of the binder of the negative electrode is within this range, adhesiveness between the negative electrode active material and the conductive additive can be maintained and sufficient adhesiveness to the current collector can be obtained.

As a method for producing the positive electrode, from a point of view of ease of production, a method is preferable in which the positive electrode is produced by producing a slurry containing the active material and a solvent and thereafter applying the slurry on the current collector and then removing the solvent.

As a method for producing the negative electrode, a method is suitably used in which a mixture of the negative electrode active material, the negative electrode additive, the conductive additive and the binder is formed on the current collector, and, from a point of view of ease of production, a method is more preferable in which a slurry is produced using the mixture and a solvent and thereafter the slurry is applied on the current collector and then the solvent is removed.

As methods for applying the slurry and removing the solvent, conventionally known conditions and methods may be appropriately used.

The solvent of the slurry is not particularly limited. However, examples of the solvent include N-methyl-2-pyrrolidone (NMP), dimethylformamide, dimethylacetamide, methyl ethyl ketone, methyl acetate, ethyl acetate, tetrahydrofuran, and the like.

<Separator>

The separator is arranged between the positive electrode and the negative electrode, and has a function as a medium that mediates conduction of lithium ions between the positive electrode and the negative electrode while preventing conduction of electrons and holes between the positive electrode and the negative electrode, and at least does not have electron or hole conductivity.

As the separator, nylon, cellulose, polysulfone, polyethylene, polypropylene, polybutene, polyacrylonitrile, polyimide, polyamide, polyethylene terephthalate, and a combination of two or more thereof can be suitably used.

As a shape of the separator, a woven fabric, a nonwoven fabric or a microporous membrane, or the like is suitably used as long as the material can form a structure that can be arranged between the positive electrode and the negative electrode and is insulating and can contain the nonaqueous electrolyte solution.

The separator may contain a plasticizer, an antioxidant or a flame retardant, and may be coated with a metal oxide or the like.

A thickness of the separator is preferably 10 μm or more and 100 μm or less, and more preferably 15 μm or more and 50 μm or less.

A porosity of the separator is preferably 30% or more and 90% or less, and, from a point of view of achieving a good balance between lithium ion diffusivity and a short circuit prevention property, is more preferably 35% or more and 85% or less, and, from a point of view that the balance is particularly excellent, is even more preferably 40% or more and 80% or less.

<Laminate>

The laminate is formed by winding or laminating an object in which the separator is arranged between the positive electrode and the negative electrode. The number of laminating layers of the laminate may be appropriately adjusted for a purpose of obtaining a desired voltage value and a desired battery capacity.

<Nonaqueous Electrolyte Solution>

The nonaqueous electrolyte solution has a function of mediating ion transfer between the negative electrode and the positive electrode, and an electrolyte solution obtained by dissolving a solute in a nonaqueous solvent, or a gel electrolyte obtained by impregnating a polymer with an electrolyte solution obtained by dissolving a solute in a nonaqueous solvent, or the like, can be used.

For the nonaqueous solvent of the nonaqueous electrolyte solution, cyclic and/or chain aprotic polar solvents are preferable.

Examples of the cyclic aprotic polar solvent include cyclic carbonate, cyclic ester, cyclic sulfone, cyclic ether, and the like.

Examples of the chain aprotic polar solvent include chain carbonate, chain carboxylic acid ester, chain ether, and the like.

As a cyclic or chain aprotic polar solvent, a cyclic compound or a chain compound such as dimethyl carbonate, methyl ethyl carbonate, dimethyl carbonate, dipropyl carbonate, methyl propyl carbonate, ethylene carbonate, propylene carbonate, butylene carbonate, γ-butyl lactone, 1,2-dimethoxyethane, sulfolane, dioxolane, or methyl propionate can be used. These solvents may each be independently used, or two or more of these solvents may be used in combination.

A ratio of a chain aprotic polar solvent in a mixed solvent of cyclic and chain aprotic polar solvents is preferably 5 vol %-95 vol % from a point of view of achieving a good balance between viscosity and solubility, and, from a point of view that the balance is particularly good, is more preferably 10 vol %-90 vol %, even more preferably 20 vol %-80 vol %, and particularly preferably 50 vol %-80 vol %.

Further, in addition to these nonaqueous solvents, a solvent such as acetonitrile that is commonly used as a solvent of a nonaqueous electrolyte solution may be further used, or an additive such as a flame retardant may be further included.

As the solute of the nonaqueous electrolyte solution, there is not particularly limited as long as the solute is a lithium salt, and $LiClO_4$, $LiBF_4$, $LiPF_6$, $LiAsF_6$, $LiCF_3SO_3$, LiBOB (Lithium Bis (Oxalato) Borate), $Li[N(SO_2CF_3)_2]$, $Li[N(SO_2C_2F_5)_2]$, $Li[N(SO_2F)_2]$, or $Li[N(CN)_2]$ is suitably used, and, from a point of view of achieving a high solubility and good cycle characteristics of the battery, $LiClO_4$, $LiBF_4$, $LiPF_6$, $Li[N(SO_2F)_2]$, or $Li[N(CN)_2]$ is more preferable.

A concentration of the lithium salt is preferably 0.5 mol/L or more and 2.0 mol/L or less.

The nonaqueous electrolyte solution may be contained in the positive electrode, the negative electrode and the separator in advance, or may be added after the object in which the separator is arranged between the positive electrode and the negative electrode is laminated.

An amount of the nonaqueous electrolyte solution is appropriately adjusted according to the areas of the positive electrode, the negative electrode and separator, the amounts of the active materials, and a volume of the battery.

<Inclusion Body>

The inclusion body is a member that encapsulates the laminate obtained by alternately laminating or winding the positive electrode, the negative electrode and the separator, and the terminals that electrically connects laminate.

As the inclusion body, a composite film obtained by providing a thermoplastic resin layer for heat sealing on a metal foil, a metal layer formed by vapor deposition or sputtering, or a metal can of a square shape, an oval shape, a cylindrical shape, a coin shape, a button shape or a sheet shape, is suitably used, and the composite film is more preferable.

As the metal foil of the composite film, from a point of view that a balance between a moisture blocking property, a weight and a cost is good, an aluminum foil can be suitably used.

As the thermoplastic resin layer of the composite film, from a point of view that a heat-sealing temperature range and a blocking property of the nonaqueous electrolyte solution are good, polyethylene or polypropylene is suitably used.

<Assembled Battery>

An assembled battery may be formed by connecting multiple lithium-ion secondary batteries.

In the assembled battery, the multiple batteries may be suitably connected in series and/or in parallel according to a desired size, capacity or voltage.

The assembled battery is preferably provided with a control circuit for confirming a state of charge of the batteries and improving safety.

EXAMPLES

In the following, the present invention is more specifically described based on Examples. However, the present invention is not limited by these Examples.

The positive electrode capacity (Qp) and the negative electrode capacity (Qn) of the electrodes were measured by charge-discharge tests.

(Charge-Discharge Test)

First, a positive electrode or a negative electrode in which an active material layer is formed on only one side of a current collector was molded into a disk-like shape having a diameter of 16 mm to obtain an operating electrode.

Next, a Li metal was punched into a disk-like shape having a diameter of 16 mm to obtain a counter electrode.

Next, the operating electrode (the coated side of the one-side coating is on an inner side), a cellulose separator, and the Li metal were laminated in this order in a test cell (HS cell manufactured by Hohsen Corporation). Thereafter, 0.15 mL of a nonaqueous electrolyte having a concentration of 1 mol/L, in which a volume ratio of a solvent was (ethylene carbonate):(dimethyl carbonate)=3:7 and a lithium salt was $LiPF_6$, was added to obtain a half battery.

Next, the half battery was allowed to stand at 25° C. for 1 day and then was connected to a charge-discharge test device (HJ1005SD8 manufactured by Hokuto Denko Co., Ltd.).

Thereafter, the half battery was repeatedly subjected to constant current charging (the termination voltage for the positive electrode: 4.3 V, and the termination voltage for the negative electrode: 3.0 V) and constant current discharging (the termination voltage for positive electrode: 3.0 V, and the termination voltage for negative electrode: 1.2 V) five times at 25° C. and 0.4 mA. The above voltage values are all values based on lithium.

The capacity of the half battery at the fifth constant current discharging was taken as Qp or Qn.

Example 1

First, a positive electrode slurry was produced by mixing a layered rock salt type lithium transition metal composite oxide ($LiNi_{0.5}Co_{0.2}Mn_{0.3}O_2$; hereinafter, referred to as NCM) as a positive electrode active material, acetylene black as a conductive additive, and PVdF as a binder such that their solid content concentrations were respectively 100 parts by weight, 5 parts by weight, and 5 parts by weight. In this case, a binder adjusted to a 5 wt % N-methyl-2-pyrrolidone (NMP) solution was used.

Thereafter, the positive electrode slurry was diluted with NMP and then was coated on one side of an aluminum foil having a thickness of 20 μm, and thereafter was dried in an oven at 120° C. Thereafter, the back side was similarly subjected to coating and drying, and vacuum drying was further performed at 170° C.

Through the above processes, a positive electrode having a positive electrode active material layer on a current collector was obtained. In this case, the positive electrode capacity (Qp) was set to 1.0 mAh/cm$^2$, and the area (Sp) of the positive electrode active material layer was set to 50 cm$^2$ for one side.

Next, a negative electrode slurry was produced by mixing a spinel type lithium titanate ($Li_{4/3}Ti_{5/3}O_4$) having an average particle diameter of 5 μm and a specific surface area of 4 m$^2$/g as a negative electrode active material, hard carbon having an average particle diameter of 9 μm and a specific surface area of 6 m$^2$/g as a negative electrode additive, acetylene black as a conductive additive, and PVdF as a binder such that their solid content concentrations were respectively 90 parts by weight, 9 parts by weight, 5 parts by weight, and 5 parts by weight. In this case, a binder adjusted to a 5 wt % N-methyl-2-pyrrolidone (NMP) solution was used.

Thereafter, the negative electrode slurry was diluted with NMP and then was coated on one side of an aluminum foil having a thickness of 20 μm, and thereafter was dried in an oven at 120° C. Thereafter, the back side was similarly subjected to coating and drying, and vacuum drying was further performed at 170° C.

Through the above processes, a negative electrode having a negative electrode active material layer on a current collector was obtained. The negative electrode capacity (Qn) was set to 1.1 mAh/cm$^2$, and the area (Sn) of the negative electrode active material layer was set to 55 cm$^2$ for one side.

Next, 13 sheets of the positive electrode, 14 sheets of the negative electrode and 28 sheets of the separator of cellulose nonwoven cloth were laminated in the order of separator/negative electrode/separator/positive electrode/separator/negative electrode/separator. The separator had a thickness of 25 μm and an area of 60 cm$^2$. Through the above processes, a laminate was obtained.

Next, a bag-like inclusion body was produced by respectively attaching terminals to the positive electrode and the negative electrode, sandwiching the laminate between two aluminum laminate films, and subjecting the aluminum laminate films to a thermal welding process at 180° C. for 7 seconds twice.

Thereafter, 12 mL of a nonaqueous electrolyte solution was included in the laminate, the nonaqueous electrolyte solution being obtained by dissolving $LiPF_6$ as a lithium salt in a mixed solvent having a volume ratio of (ethylene carbonate):(dimethyl carbonate)=3:7 such that a concentration of $LiPF_6$ was 1.0 M.

Then, the inclusion body was sealed by subjecting the remaining side to a thermal welding process at 180° C. for 7 seconds twice, and a lithium-ion secondary battery with the laminate and the nonaqueous electrolyte solution sealed therein was obtained. In this case, Mt/Ma=10, Sp/Sn=0.91, and Qp/Qn=0.91.

Example 2

Example 2 was the same as Example 1 except that silicon was used as a negative electrode additive.

Example 3

Example 3 was the same as Example 1 except that bismuth was used as a negative electrode additive.

Example 4

Example 4 was the same as Example 1 except that tin was used as a negative electrode additive.

Example 5

Example 5 was the same as Example 1 except that a spinel type lithium manganate ($Li_{1.1}Al_{0.1}Mn_{1.8}O_4$; hereinafter, referred to as LMO) was used in place of NCM as a positive electrode active material.

Example 6

Example 6 was the same as Example 1 except that, in the negative electrode, the amount of the negative electrode active material was set to 80 parts by weight and the amount of the negative electrode additive was set to 20 parts by weight. In this case, Mt/Ma=4.

Example 7

Example 7 was the same as Example 1 except that, in the negative electrode, the amount of the negative electrode active material was set to 60 parts by weight and the amount of the negative electrode additive was set to 40 parts by weight. In this case, Mt/Ma=1.5.

Example 8

Example 8 was the same as Example 1 except that, in the negative electrode, the amount of the negative electrode active material was set to 90 parts by weight and the amount of the negative electrode additive was set to 6 parts by weight. In this case, Mt/Ma=15.

Example 9

Example 9 was the same as Example 1 except that, in the negative electrode, the amount of the negative electrode active material was set to 100 parts by weight and the amount of the negative electrode additive was set to 4 parts by weight. In this case, Mt/Ma=25.

Comparative Example 1

Comparative Example 1 was the same as Example 1 except that Sp was set to 55 cm² for one side, and Sn was set to 50 cm² for one side. In this case, Mt/Ma=10, Sp/Sn=1.10 and Qp/Qn=0.91.

Comparative Example 2

Comparative Example 2 was the same as Example 1 except that Qp was set to 1.1 by coating the positive electrode slurry in a thicker layer than that in Example 1 and Qn was set to 1.0 by coating the negative electrode slurry in a thinner layer than that in Example 1. In this case, Sp/Sn=0.91, and Qp/Qn=1.10.

Comparative Example 3

Comparative Example 3 was the same as Example 1 except that, in the negative electrode, the amount of the negative electrode active material was set to 99 parts by weight and the amount of the negative electrode additive was set to 3.3 parts by weight. In this case, Mt/Ma=30, and Qp/Qn=0.91.

(Evaluation of Cycle Characteristics of Lithium-Ion Secondary Battery)

Each of the lithium-ion secondary batteries of Examples and Comparative Examples was connected to a charging and discharging device (HJ1005SD8, manufactured by Hokuto Denko Co., Ltd.), and was subjected to an aging process, and thereafter, a charging and discharging cycle operation was performed.

In the aging process, first, each of the lithium-ion secondary batteries was fully charged (to 2.7 V), and thereafter, the battery was allowed to stand at a temperature of 60° C. for 168 hours, and then, the battery was gradually cooled to 25° C. The above voltage is not based on lithium, but is a voltage of the lithium-ion secondary battery.

In the charging and discharging cycle operation, with respect to the battery after the aging process, 250 mA constant current charging and 500 mA constant current discharging were repeated 500 times in an environment of 60° C. In this case, the charge termination voltage and the discharge termination voltage were respectively set to 2.7 V and 2.0 V. The above voltages are not based on lithium, but are voltages of the lithium-ion secondary battery.

A ratio of a 500th discharge capacity to a 1st discharge capacity was taken as a capacity retention rate. For example, when the 1st discharge capacity is 100 and 500th discharge capacity is 80, the capacity retention rate is 80%. A battery having a capacity retention rate of 80% or more was regarded as having satisfactory cycle characteristics (indicated using "A" in Table 1), and a battery having a capacity retention rate of less than 80% was regarded as having unsatisfactory cycle characteristics (indicated using "B" in Table 1).

(Evaluation of Safety of Lithium-Ion Secondary Battery)

Each of the batteries was subjected to an aging process and then was overcharged to 3.8 V, and then was disassembled and the negative electrode was observed. A battery in which Li metal was not precipitated on the negative electrode was regarded as having satisfactory safety (indicated using "A" in Table 1), and a battery in which Li metal was precipitated on the negative electrode was regarded as having unsatisfactory safety (indicated using "B" in Table 1).

TABLE 1

| Level | Positive Electrode Active Material | Negative Electrode Additive | Mt/Ma | Sp/Sn | Qp/Qn | Capacity Retention Rate | Cycle Characteristics | Safety |
|---|---|---|---|---|---|---|---|---|
| Example 1 | NCM | Hard Carbon | 10 | 0.91 | 0.91 | 90 | A | A |
| Example 2 | NCM | Si | 10 | 0.91 | 0.91 | 88 | A | A |
| Example 3 | NCM | Bi | 10 | 0.91 | 0.91 | 82 | A | A |
| Example 4 | NCM | Sn | 10 | 0.91 | 0.91 | 86 | A | A |
| Example 5 | LMO | Hard Carbon | 10 | 0.91 | 0.91 | 93 | A | A |
| Example 6 | NCM | Hard Carbon | 4 | 0.91 | 0.91 | 92 | A | A |
| Example 7 | NCM | Hard Carbon | 1.5 | 0.91 | 0.91 | 91 | A | A |
| Example 8 | NCM | Hard Carbon | 15 | 0.91 | 0.91 | 90 | A | A |
| Example 9 | NCM | Hard Carbon | 25 | 0.91 | 0.91 | 90 | A | A |
| Comparative Example 1 | NCM | Hard Carbon | 10 | 1.10 | 0.91 | 65 | B | B |
| Comparative Example 2 | NCM | Hard Carbon | 10 | 0.91 | 1.10 | 77 | B | B |
| Comparative Example 3 | NCM | Hard Carbon | 30 | 0.91 | 0.91 | 90 | A | B |

(Overall Evaluation of Table 1)

In Examples 1-9, batteries each having a capacity retention rate of 80% or more and excellent cycle characteristics and satisfactory safety were obtained. In contrast, in Comparative Examples 1-3, it was not able to achieve both satisfactory cycle characteristics and satisfactory safety.

DESCRIPTION OF REFERENCE NUMERALS

[0123]
1: positive electrode
2: negative electrode
3: separator
6: non aqueous electrolyte solution
7: terminals
8: inclusion body
10: lithium-ion secondary battery

The invention claimed is:

1. A lithium-ion secondary battery comprising:
a laminate comprising a positive electrode, a negative electrode, and a separator;
a nonaqueous electrolyte solution;
terminals; and
an inclusion body,
wherein the negative electrode comprises: a negative electrode active material comprising a titanium-containing oxide; and at least one negative electrode additive,
a ratio of a weight (Ma) of the at least one negative electrode additive and a weight (Mt) of the negative electrode active material satisfies 1.0<Mt/Ma<30.0,
an area (Sp) of a positive electrode active material layer of the positive electrode is smaller than an area (Sn) of a negative electrode active material layer of the negative electrode,
a positive electrode capacity (Qp) is smaller than a negative electrode capacity (Qn), and the at least one negative electrode additive has a specific surface area of from 1 m2/g to 15 m2/g, and
wherein the at least one negative electrode additive is at least one selected from the group consisting of graphite and hard carbon,
wherein the positive electrode comprises, as a positive electrode active material, a layered rock salt type lithium transition metal composite oxide represented by $Li_a Co_{1-x-y}Ni_xMn_yO_2$ where $0.9 \leq a \leq 1.2$, $x \geq 0$, $y \geq 0$, and $0 \leq x+y \leq 1$.

2. The lithium-ion secondary battery according to claim 1, wherein 1.0<Mt/Ma<10.0 is satisfied.

3. The lithium-ion secondary battery according to claim 1, wherein 0.9<Sp/Sn<1.0 is satisfied.

4. The lithium-ion secondary battery according to claim 1, wherein 0.9<Qp/Qn<1.0 is satisfied.

5. The lithium-ion secondary battery according to claim 1, wherein the titanium-containing oxide is lithium titanate.

6. An assembled battery, formed by connecting a plurality of the lithium-ion secondary batteries according to claim 1.

7. The lithium-ion secondary battery according to claim 1, wherein $1.5 \leq Mt/Ma \leq 25.0$ is satisfied.

8. The lithium-ion secondary battery according to claim 1, wherein $1.5 \leq Mt/Ma \leq 10.0$ is satisfied.

9. The lithium-ion secondary battery according to claim 1, wherein the positive electrode active material layer of the positive electrode has a density of from 1.0 g/cm$^3$ to 4.0 g/cm$^3$.

10. The lithium-ion secondary battery according to claim 1, wherein the negative electrode active material layer of the negative electrode has a density of from 0.8 g/cm$^3$ to 3.0 g/cm$^3$.

11. The lithium-ion secondary battery according to claim 1, wherein the at least one negative electrode additive has a specific surface area of from 2 m$^2$/g to 15 m$^2$/g.

* * * * *